Oct. 10, 1933.  J. HUFF  1,929,495
SELF CENTERING EXPANSIBLE PISTON
Filed June 5, 1931  3 Sheets-Sheet 2
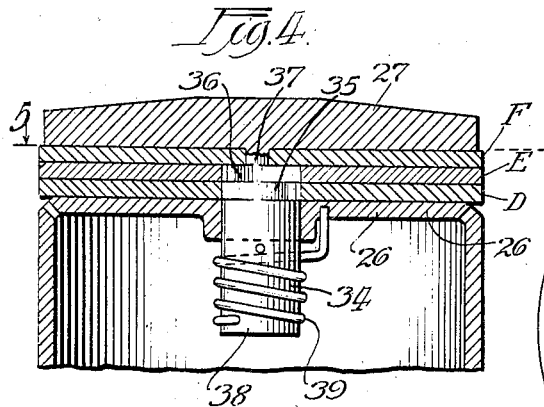
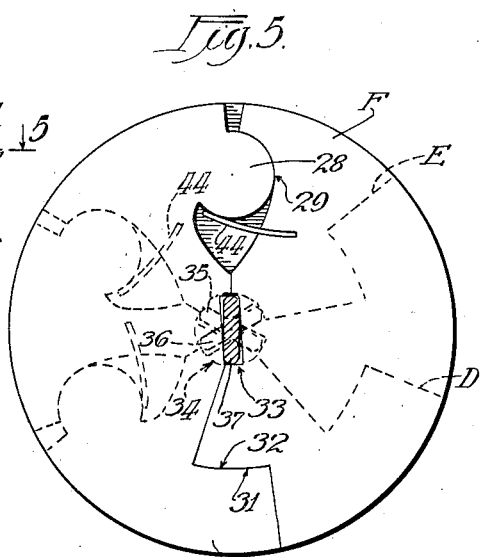
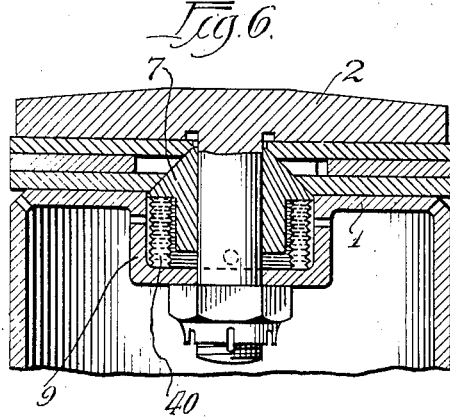
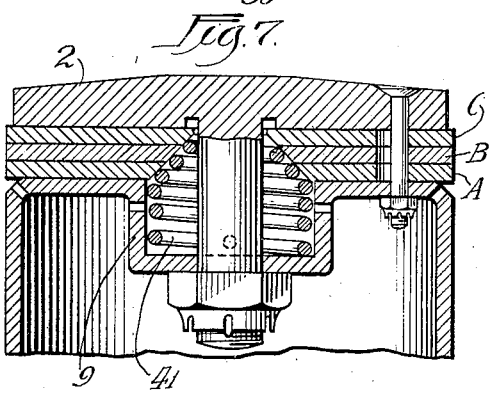
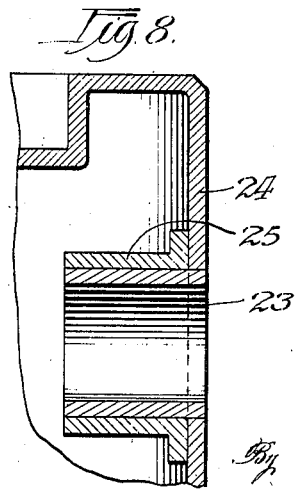

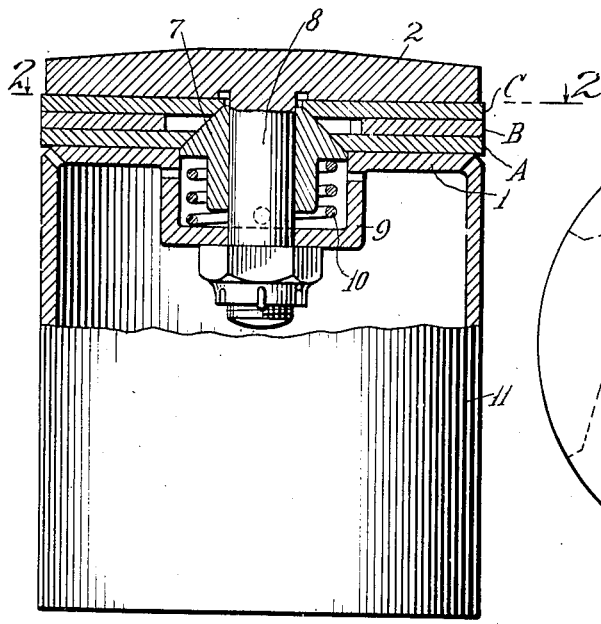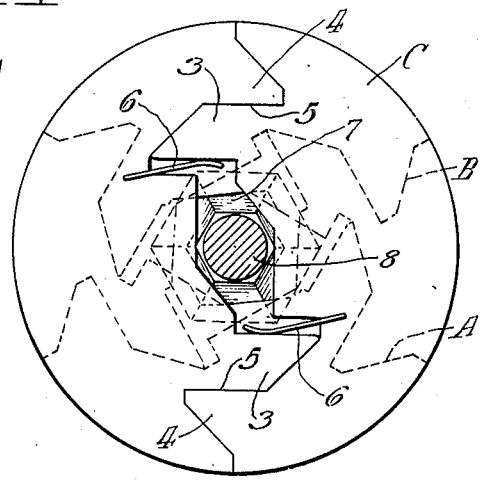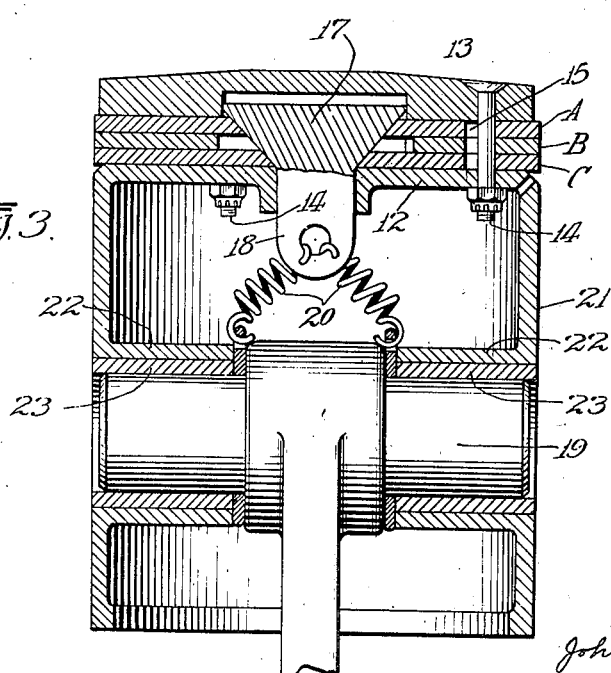

Oct. 10, 1933.  J. HUFF  1,929,495
SELF CENTERING EXPANSIBLE PISTON
Filed June 5, 1931  3 Sheets-Sheet 3
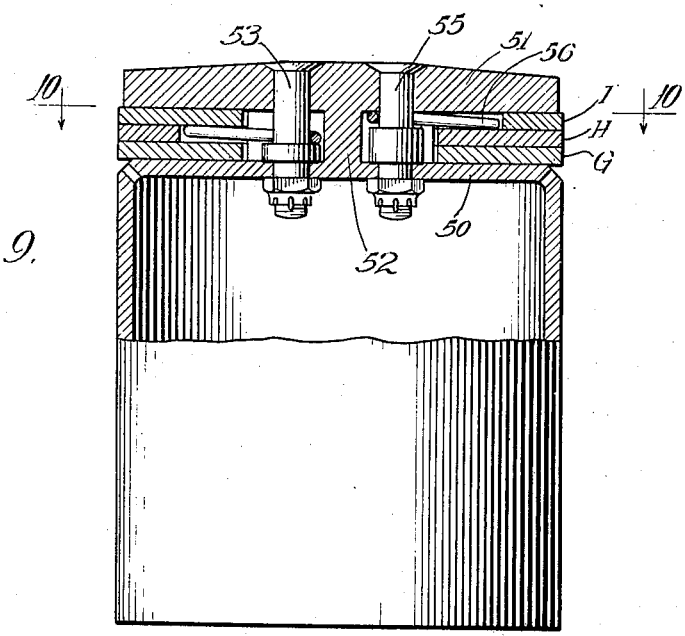
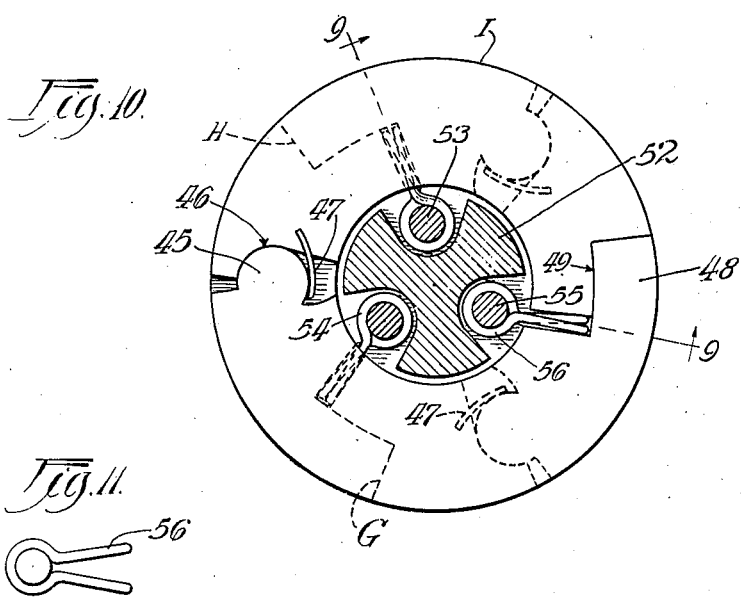
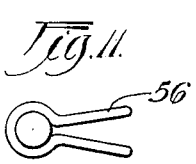

Patented Oct. 10, 1933

1,929,495

UNITED STATES PATENT OFFICE 1,929,495

SELF-CENTERING EXPANSIBLE PISTON

John Huff, Chicago, Ill.

Application June 5, 1931. Serial No. 542,247

1 Claim. (Cl. 309—40)

The present invention has for its object to produce a simple and novel means for packing and centering pistons or piston-like devices.

In carrying out my invention I employ, instead of a resilient packing ring, a stiff metal plate or disk divided into sections movable relatively to each other to expand or contract the plate or disk; such a plate or disk, or a plurality thereof, lying one upon the other, being positioned between two holding members having flat faces in contact with the flat faces of the plate or plates. When a composite structure of this kind is placed in a cylinder or the like, and means are provided to exert an expanding force on the sectional plate or plates, the plate or plates will produce a seal between the device and the surrounding cylinder wall and will hold the device centered in the cylinder. Preferably means are provided to exert a constant pressure tending to expand the plate or plates. The bearing elements on the piston may, therefore, be composed of material best adapted for that purpose, without being confined to materials that will give resiliency to a ring or other element. Furthermore, if desired, the piston device may constitute an independent unit adapted to be assembled with the piston body of any kind. Furthermore, the device may be on the extreme end of the piston structure, so as to be easily accessible for replacement and repair. While my improved device may be employed in connection with or in addition to ordinary piston rings, it may be used entirely as a substitute for piston rings; thus permitting the body of the piston on which my improved device is simply mounted to be made light and be manufactured by processes not suitable in the cases of pistons having packing rings.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view partly in elevation and partly in central longitudinal section showing an internal combustion engine piston equipped in accordance with the present invention; Fig. 2 is a section on line 2—2 of Fig. 1; Fig. 3 is a central longitudinal section through an internal combustion engine piston equipped in accordance with my invention in a somewhat different form; Fig. 4 is a central longitudinal section through the end of the piston, illustrating still another form of my invention; Fig. 5 is a section taken on line 5—5 of Fig. 4; Figs. 6 and 7 are views similar to Fig. 4, showing further modifications; Fig. 8 is a central longitudinal section through a fragment of a piston to which my improvement may be applied; Fig. 9 is a view partly in elevation and partly in section, the said section being taken on line 9—9 of Fig. 10, showing a still further modification; Fig. 10 is a section on line 10—10 of Fig. 9; and Fig. 11 is a plan view of one of the expanding springs, expanded.

Referring to Figs. 1 and 2 of the drawings, 1 represents a member having a broad flat face above and spaced apart from which is a second member 2 having a broad flat under face parallel with the opposed face of the member 1. Between the members 1 and 2 is arranged my improved expanding and centering device which may be made of one or more similar elements superposed upon each other. In the arrangement shown, there are three of such elements, indicated at A, B and C, in Fig. 1, these three elements being in the form of flat metal disks or plates having sliding contact with each other and with the members 1 and 2.

Each expanding and centering member or disk is made of a plurality of sections, relatively movable in the plane thereof and having edge faces which at all times remain in contact with each other. Therefore, regardless of the relative positions in which the sections of the disk may happen to be, the disk acts as a barrier to the passage of fluids inwardly through an edge of the same. It is, of course, possible to divide a disk in a variety of ways to produce the ends sought. In the arrangement shown in Figs. 1 and 2, each disk is divided diametrically into two parts or halves. Each half has, at its inner edge, a long tongue 3 cooperating with a tongue 4 on the opposite half. The long lines of contact 5, 5 between the two sets of tongues are parallel with each other and, therefore, determine directions of relative movements permissible between the two halves of the disk or plate. Since the joints along the lines 5, 5 remain closed in all relative positions of the parts, no fluids can pass through the same. When the three sectional plates lie upon each other and contact with the members 1 and 2, the sectional plates prevent any fluids from penetrating into the space between the members 1 and 2 beyond the points where the closed joints 5, 5 occur. If desired, the pockets into which the tongues 3 and 4 extend may be made somewhat wider than the tongues, thereby providing room for springs, shown as being leaf springs 6, 6 each of which is fixed to one half of the disk and bears against an edge of the tongue 3 on the other half.

Some means must be provided to expand the sectional disks or plates to hold them in contact with the surrounding cylinder wall, both initially and after wear takes place. This may be done in a variety of ways. In the arrangement shown in the figures under discussion, the centers of the sectional disks or plates are cut away, and in the space thus provided I place a cone 7 that may conveniently be slidable upon a post 8 extending from the center of the holding plate 5 down through the holding plate 1, for the purpose of securing the assembly together. The member 1 is provided with a central depressed or cup-shaped portion 9 into which the large end of the cone extends. Within the chamber in the part 9 is a compression spring 10 engaged with the under side of the cone and pressing it constantly in the upward direction. I have referred to the part 7 as being a cone, although it need not be circular in cross section, but may be a pyramid of any desired number of sides or faces. The sectional plates are all alike, except that the central holes vary in size to correspond to the slope of the wedge, cone, or cam.

The holding member or plate 1 may conveniently be the end of the piston 11 of an internal combustion engine, in which case the cylinder proper may be made comparatively light, and, if desired, be produced by a metal drawing operation. Also, even if the member 1 serves as the head or end of the cylinder body, it may be made as a separate element welded or otherwise secured to the latter.

In the arrangement shown in Fig. 3, the sectional plates A, B and C are arranged in the reverse order from that shown in Fig. 1, between a bottom holding member 12 and an upper holding member 13; the members 12 and 13 being connected together by bolts 14 passing through the same and through radially elongated slots 15 in the sectional plates or disks. These slots are so disposed that the joints in one plate or disk are staggered with respect to the joints in the adjacent disk or disks. In this form of device, the wedge block 17 has its large end at the top. The wedge block is provided with a depending stem 18 between which and the wrist pin 19 extend a pair of tension springs 20. These springs, therefore, tend constantly to draw the wedge block down while exerting an upward pull on the wrist pin, thereby taking up any slack that there may be in the wrist pin bearing. Fig. 3 further shows a piston body construction in which the holding plate 12 forms the end or head of the drawn shell 21 provided with tubular hub portions 22, 22 pressed inwardly therefrom opposite each other. Within these hub portions are suitable bushings 23 of anti-friction material that form the actual bearings for the wrist pin. A slightly different arrangement is shown in Fig. 8 in which the drawn metal shell 24 has separate tubular hub portions 25 welded thereto; these hubs containing the bushings 23, as in Fig. 3.

In Figs. 4 and 5, I have shown a further modification. As in the previous forms, there are three sectional disks or plates D, E and F arranged between holding plates 26 and 27. The two halves of each disk or plate are hinged together so that their relative movements are swinging movements instead of being rectilinear, as in Fig. 2. To this end each half disk has on its inner edge, near one end of the latter, a lug 28 whose periphery forms an arc of a circle, preferably more than a semi-circle; this lug fitting within a correspondingly shaped but much shorter seat or recess 29 in the other half of the disk. A spring 44 on the member or section having therein the seat presses against the lug and yieldingly holds it in the seat. Diametrically opposite this hinge connection between the two halves of the plate is a sliding connection consisting of a tongue 30 on one half or section having an inner edge 31 in the form of an arc of a circle whose center corresponds to the center of the center or axis of the hinge joint. The other section has an outwardly faced edge 32 complementary to the inwardly facing edge 31. Therefore, when the two sections are moved relatively about their hinge axis, the edge faces 31 and 32 remain in contact with each other, as do the edge faces at the hinge joint.

In the center of each of the disks D, E and F is an opening 33. Depending from the center of the top holding member 27 is a post 34 shaped to produce thereon three cross arms 35, 36 and 37. Each cross arm is longer than one transverse dimension of the openings in the sectional disks, and is located at such a point along the post or stem 34 that it lies in the plane of one of the disks. Therefore, upon turning the post or stem, the cross arms will act as cams to spread the sections of the several disks. In the arrangement shown, the lower end of the stem or post is enlarged in diameter, as indicated at 38, this enlarged part projecting through and below the lower holding plate 26. Surrounding the member 38 is a torsion spring 39, one end of which is fixed to the member 38, while the other end is anchored to the holding plate 26. The parts are so proportioned that, when the sections of the divided plates or disks are closed upon each other, the spring is wound up and thereafter exerts a constant effort to turn the stem or post in a direction to expand the sectional disks. The post and the spring serve further to hold the top holding member 27 in place. It will be seen that, by making the central holes in the sectional plates alike, while displacing them relatively to each other angularly of the central axis, the joints in each disk will be staggered with respect to those in the adjacent disk or disks.

In Fig. 6, I have illustraed a construction similar to that in Fig. 1, although the sectional disks may take any form. However, instead of employing a spring beneath the wedge block, there is in this embodiment of my invention a vertically expansible annular shell 40 adapted to be filled with a volatile substance. When the device is used in an engine, and the engine warms up, the material within the shell expands, tending to expand the shell in the vertical direction and thus exerting an upward pressure on the wedge block.

In Fig. 7, there is shown an arrangement similar to that in Figs. 1 and 6, excepting that, instead of employing a wedge block and a separate pressure means, I have provided a coil spring 41 whose upper turns are reduced in diameter to form a cone 42. Therefore, the spring serves the double purpose of the spring of the pressure device and of the cone or wedge to transmit to the sectional disks the force exerted by the pressure device.

In Figs. 9–11 there is shown still another modification. In this form of my invention there are shown three plates G, H and I, similar to those in Fig. 5, but cut away at the center to give them the shape of flat rings. Each plate is in two sections joined at one end by a hinge consisting of the arc-shaped lug 45 and the arc-shaped seat 46; there being a spring 47 to hold the lug against the seat. On one of the sections, diametrically opposite the hinge, is a tongue 48 whose inner edge is in the form of an arc of a circle struck about the axis of the hinge joint as a center. This tongue engages with an outwardly-facing curved edge seat 49 on the other section and maintains contact therewith during relative swinging movements of the sections. The plates lie between a lower holding member 50 and an upper holding member 51. These two holding members are shown as being made in one piece, being joined by a central post or neck 52. Three pins or posts 53, 54 and 55, spaced one hundred and twenty degrees apart from each other, span the space between the holding members. On each pin is a U-shaped spring 56. The free ends of the arms of each of these springs enters a narrow radial space between the inner edges of the two sections of one of the plates at the base of the tongue 48. Normally the springs take the shape illustrated in Fig. 11; but, when it is assembled in the piston device, and the plate is contracted, as shown in Figs. 9 and 10, the arms of the spring are pressed together and thereafter constantly exert a pressure in a direction to expand the plate.

While I have illustrated and described with particularity only a single preferred form of my invention, with a few modifications, I do not desire to be limited to the exact structural details thus illustrated and described; but intend to cover all forms and arrangements which come within the definitions of my invention constituting the appended claim.

I claim:

A self centering, expansible and contractile piston device comprising a flat metal plate divided into two sections; one section having at one end an arc-shaped lug fitting into a complementary seat in the edge of the other section and forming a hinge joint in which there is an edge face contact between the relatively movable parts; one of said sections having at the opposite end a tongue whose inner edge is an arc of a circle whose center is at the hinge axis, and the other section having a part whose outer edge is an arc of a circle fitting against the latter tongue, holding members on opposite sides of and having broad faces in contact with said plate, and means to swing said members away from each other.

JOHN HUFF.